(12) United States Patent
Wong et al.

(10) Patent No.: US 10,860,294 B2
(45) Date of Patent: Dec. 8, 2020

(54) REQUIREMENTS TRACING PRECISION VALIDATION TOOL

(71) Applicant: Rockwell Collins, Inc., Cedar Rapids, IA (US)

(72) Inventors: Jason L. Wong, Marion, IA (US); May C. Chan, Marion, IA (US); Ronald E. Klose, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/258,318

(22) Filed: Jan. 25, 2019

(65) Prior Publication Data

US 2020/0241845 A1 Jul. 30, 2020

(51) Int. Cl.
*G06F 8/10* (2018.01)
*G06F 40/211* (2020.01)
*G06F 11/36* (2006.01)

(52) U.S. Cl.
CPC ............ *G06F 8/10* (2013.01); *G06F 11/3664* (2013.01); *G06F 11/3692* (2013.01); *G06F 40/211* (2020.01)

(58) Field of Classification Search
None
See application file for complete search history.

(56) References Cited

U.S. PATENT DOCUMENTS

| | | | | |
|---|---|---|---|---|
| 5,963,940 A | * | 10/1999 | Liddy | G06F 16/3329 |
| 2006/0064178 A1 | * | 3/2006 | Butterfield | G06F 8/20 |
| | | | | 700/18 |
| 2008/0263505 A1 | * | 10/2008 | StClair | G06F 8/10 |
| | | | | 717/101 |
| 2009/0319997 A1 | * | 12/2009 | Lichtenberg | G06F 11/3636 |
| | | | | 717/126 |
| 2013/0016875 A1 | * | 1/2013 | Boulila | G06F 8/10 |
| | | | | 382/103 |
| 2013/0117725 A1 | * | 5/2013 | Bnayahu | G06F 8/75 |
| | | | | 717/101 |
| 2015/0286631 A1 | * | 10/2015 | Sethu | G06F 40/284 |
| | | | | 704/9 |
| 2018/0246703 A1 | * | 8/2018 | Ren | G06F 9/44 |
| 2020/0074229 A1 | * | 3/2020 | AlShikh | G06F 40/30 |
| 2020/0089476 A1 | * | 3/2020 | Verhaeghe | G06F 8/20 |

* cited by examiner

*Primary Examiner* — Philip Wang
(74) *Attorney, Agent, or Firm* — Suiter Swantz pc llo (57) ABSTRACT

A requirements tracing validation tool analyzes an input corresponding to a requirements tracing set to identify high-level requirements and artifacts, subsystem-level requirements and artifacts, current links tracing between the requirements and the artifacts, and linguistic and logical elements of each identified artifact or link. The tool evaluates each link and provides a confidence level as to the correctness of the link. The tool may recommend additional links not already within the set and evaluate the recommended links for correctness. Further, the tool may evaluate the correctness of a given requirement over time as the requirements tracing set and its environment develops, and offer suggestions for amending the wording of artifacts and links to enhance uniformity and clarity throughout the requirements tracing set and increase the likely correctness of all traces and links within the environment.

19 Claims, 8 Drawing Sheets

REQUIREMENTS TRACING PRECISION VALIDATION TOOL

BACKGROUND

Certified software-based airborne systems and equipment (e.g., certification according to RTCA DO-178C by North American and European authorities) require documented links, or connections, between certification artifacts. For example, subsystem and lower-level requirements (e.g., directed to an engine indication and crew alerting system (EICAS)) must trace up to higher-level requirements at the system or platform level. System or subsystem requirements must be fulfilled by the underlying source code, or each line of source code must trace to a requirement. With respect to system-critical avionics software, requirements tracing must be of high quality (e.g., established traces between lower-level and higher-level artifacts must be correct) as well as complete (e.g., any requirement that should trace to another requirement or requirements actually does so). Requirements tracing tools (such as Reqtify, developed by 3DS/Dassault Systèmes) may help manage traceability across multiple systems or project levels. However, such conventional tracing tools are only concerned with ensuring that at least one link exists for any requirement. Further, conventional tools have no way of assessing whether any existing links are indeed correct, nor whether and where additional links should exist if they have not already been added in development.

SUMMARY

In one aspect, embodiments of the inventive concepts disclosed herein are directed to a requirements tracing validation tool. The tool includes data storage for storing executable instructions and receives a requirements input in text or any appropriate format, the requirements input corresponding to a requirements set. A natural language engine identifies within the input high-level (e.g., system-level or applicant-level) requirements or artifacts, lower-level or subsystem-level requirements or artifacts, and links tracing the subsystem-level artifacts to higher-level artifacts. The natural language engine also identifies orphan requirements and links not currently connected to any trace or link. The tool includes a link correctness engine that evaluates the correctness of all identified links, providing a confidence level that the link is correct. The link correctness engine also recommends additional links or traces between artifacts or requirements based on their component linguistic elements and provides a confidence level that the recommended links will be correct.

In a still further aspect, embodiments of the inventive concepts disclosed herein are directed to a method for requirements tracing validation. The method includes receiving, via a tracing validation tool, a requirements input associated with a requirements tracing set. The method includes identifying, within the requirements input, high-level requirements and artifacts, subsystem-level requirements and artifacts, currently existing links tracing the subsystem-level artifacts to each other and to higher-level artifacts. The method includes assessing the identified links, based on their linguistic and logical components, to determine a confidence level that the link is correct.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a tool and related method for requirements tracing precision validation (RTPV). The RTPV tool improves on conventional tracing tools by evaluating the quality of links or traces from subsystem-level to system-level requirements (or between subsystem-level artifacts), rather than merely identifying their existence. Further, the RTPV tool may be trained by machine learning to identify orphan requirements and recommend new links or traces (or suggest wording modifications to requirements) based on the likelihood that the recommended links will be correct and should be added. Finally, the RTPV tool can trace the overall health of requirements and links over time, as an environment develops.

Figure 1:
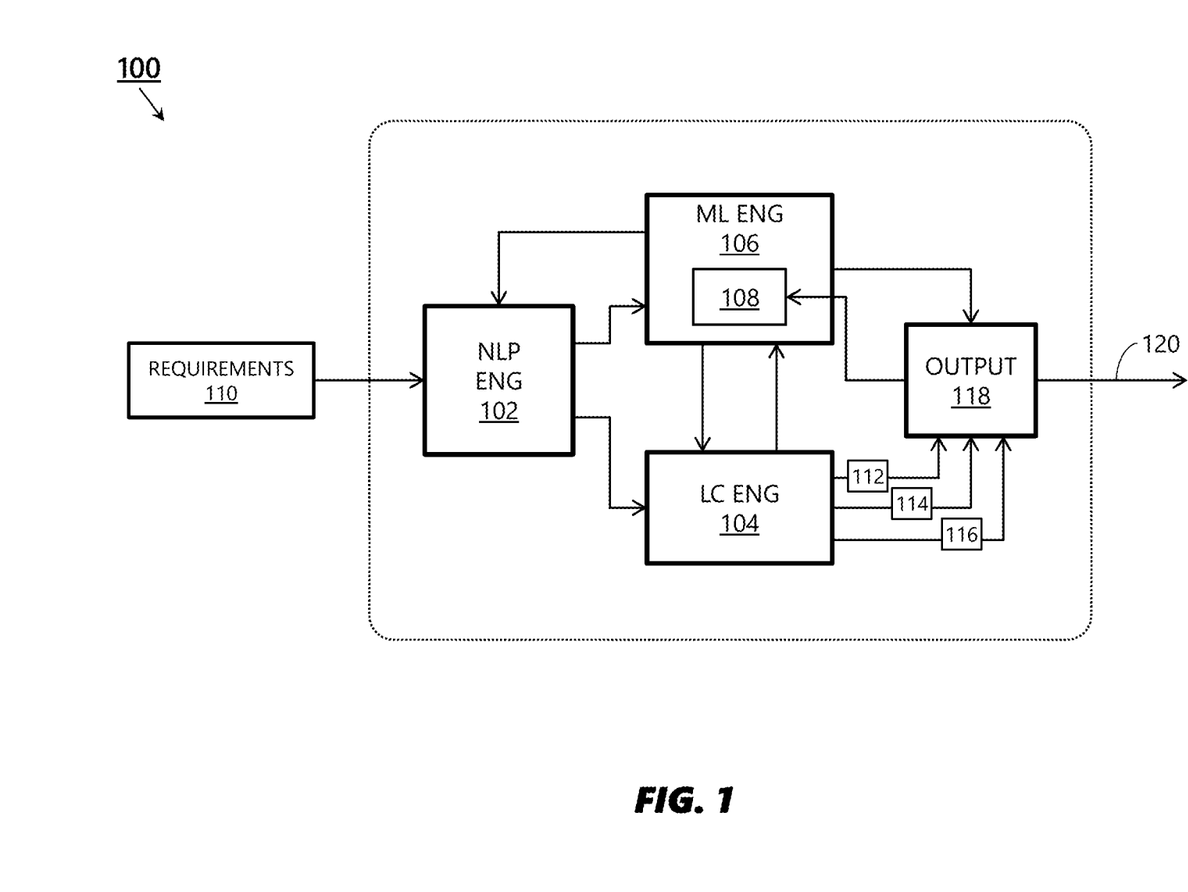
FIG. 1 is a diagrammatic illustration of an exemplary embodiment of a tool for requirements tracing validation according to the inventive concepts disclosed herein.

Referring to FIG. 1, an exemplary embodiment of a requirements tracing precision validation (RTPV) tool 100 according to the inventive concepts disclosed herein may include a natural language processing (NLP) engine 102, a link correctness (LC) engine 104, and a machine learning (ML) engine 106 incorporating memory 108 or other like data storage accessible to the processors on which the NLP engine, LC engine, and ML engine are executing.

As the software aspects of avionics systems or subsystems are developed, the associated system and subsystem requirements (as well as the network of connecting links) may be mapped and logged. At any given development phase, a requirements input 110 may be developed; the requirements input may be a text file or similar representation of the complete set of requirements and links for any given system or subsystem. The NLP engine 102 may receive the requirements input 110 and analyze the text to identify existing requirements and links (e.g., traces) as well as key components thereof. Based on these identifications, the LC engine 104 may assess each existing link for quality, determining a correctness confidence level (112) or percentage likelihood that the given link is correct.

The ML engine 106 may enable the RTPV tool 100 to be "trained"; for example, an analysis of a given requirements input 110 for quality and completeness may inform subsequent analyses by the RTPV tool of the current or of future requirement sets. Based on prior requirements tracing evaluations by the RTPV tool 100 as well as the analysis of the NLP engine 102, the LC engine 104 may recommend links (114) where they do not currently exist. For example, the LC engine 104 may recommend potential links between a given subsystem requirement and other system requirements based on a component analysis of said requirements. In addition, the LC engine 104 may determine a correctness confidence level (116) or percentage likelihood that a given recommended link 114 should be added to the requirements set. Based on the findings and analysis of the NLP engine 102 and the LC engine 104, output reports 118 summarizing the recommended links 114 and correctness confidence levels 112, 116 may be generated for external use (120) or for storage by the memory 108. In this way, archived output reports 118 may be used to train the RTPV tool 100 to more accurately monitor requirements tracing for a given software aspect as it progresses through development.

Figure 2:
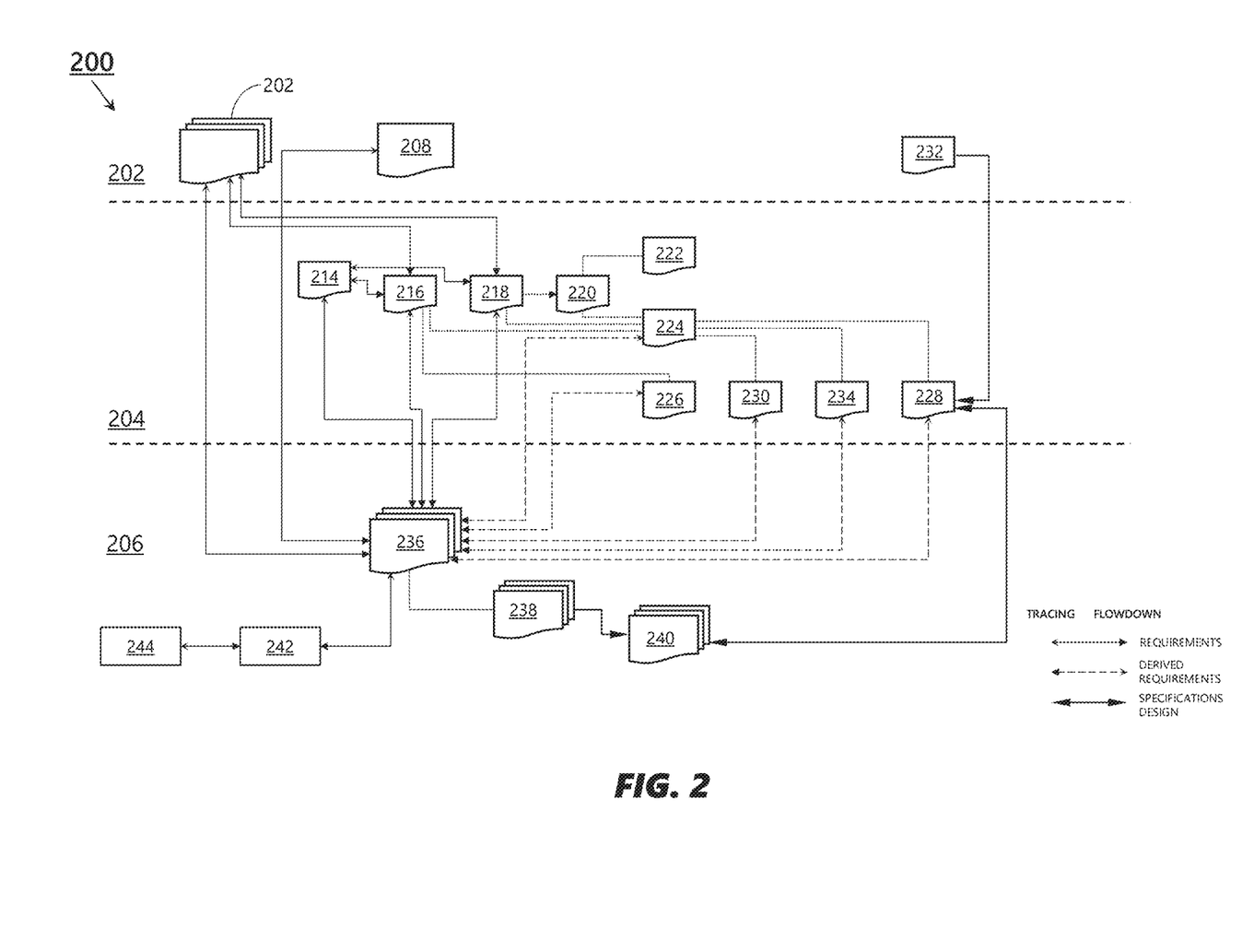
FIG. 2 is a diagrammatic illustration of system and subsystem requirements addressed by the tool of FIG. 1.

Referring to FIG. 2, a requirements map 200 for an avionics software environment may correspond to the requirements input 110 of FIG. 1. For example, the RTPV tool 100 of FIG. 1 may analyze avionics software aspects or software environments associated with other mobile platforms (e.g., land-based or water-based vehicles) or even healthcare or educational software environments not tied to an aircraft or other vehicle but subject to similarly rigorous requirements training standards.

The requirements map 200 may encompass an applicant level 202, system level 204, and subsystems domains 206. Applicant-level requirements 202 (e.g., client-specific requirements) may include high-level requirements 208 as well as governing regulations 210 (e.g., Technical Standard Orders (TSO); Minimum Operational Performance Standards (MOPS); Federal/Joint Aviation Requirements (FARS/JARS) promulgated by the United States Federal Aviation Administration (FAA), European Aviation Safety Agency (EASA), and/or other like regulatory agencies; and federal Advisory Circulars (AC)) and third party interface control documents 212 (ICD).

Systemwide requirements and artifacts 204 may include system requirement artifacts (e.g., safety requirements 214 (SR), system architecture requirement documents 216 (SARD), flight deck operational requirements 218 (FDOR), master format requirement documents 220 (MFRD)) and systems design artifacts (e.g., graphical user interface (GUI) convention descriptions 222 (GCD), system design descriptions 224 (SyDD), latency allocation documents 226 (LAD), system data dictionaries 228 (LIDD) including input/output maps/tables 230 (AIO/IOT) and which may trace up to third-party interface control documents 232 (ICD), physical interconnect definition documents 234 (PIDD)) which both trace up toward high-level requirements 208 and regulations 210 and flow downward to the subsystems domains 206. The subsystems domains 206 include requirement documents and specifications 236, design documents 238, and integrated data dictionaries 240 (IDD) directed to avionics subsystems, e.g., avionics flight displays (AFD), EICAS, flight guidance computers (FGC) and other flight control systems, human-machine interactions (HMI), and legacy systems. The RTPV tool 100 is concerned primarily with validating requirements tracing between the system level 204 and subsystems domains 206.

Within the subsystem level 206, the RTPV tool 100 may further evaluate links or traces between subsystem-level requirements (236) and other subsystem-level artifacts, such as subsystem-level verifications (242) or subsystem-level executable source code (244). Similarly, the RTPV tool 100 may recommend additional links or traces between these subsystem-level artifacts based on its analysis of the requirements input 110.

Figure 3A:
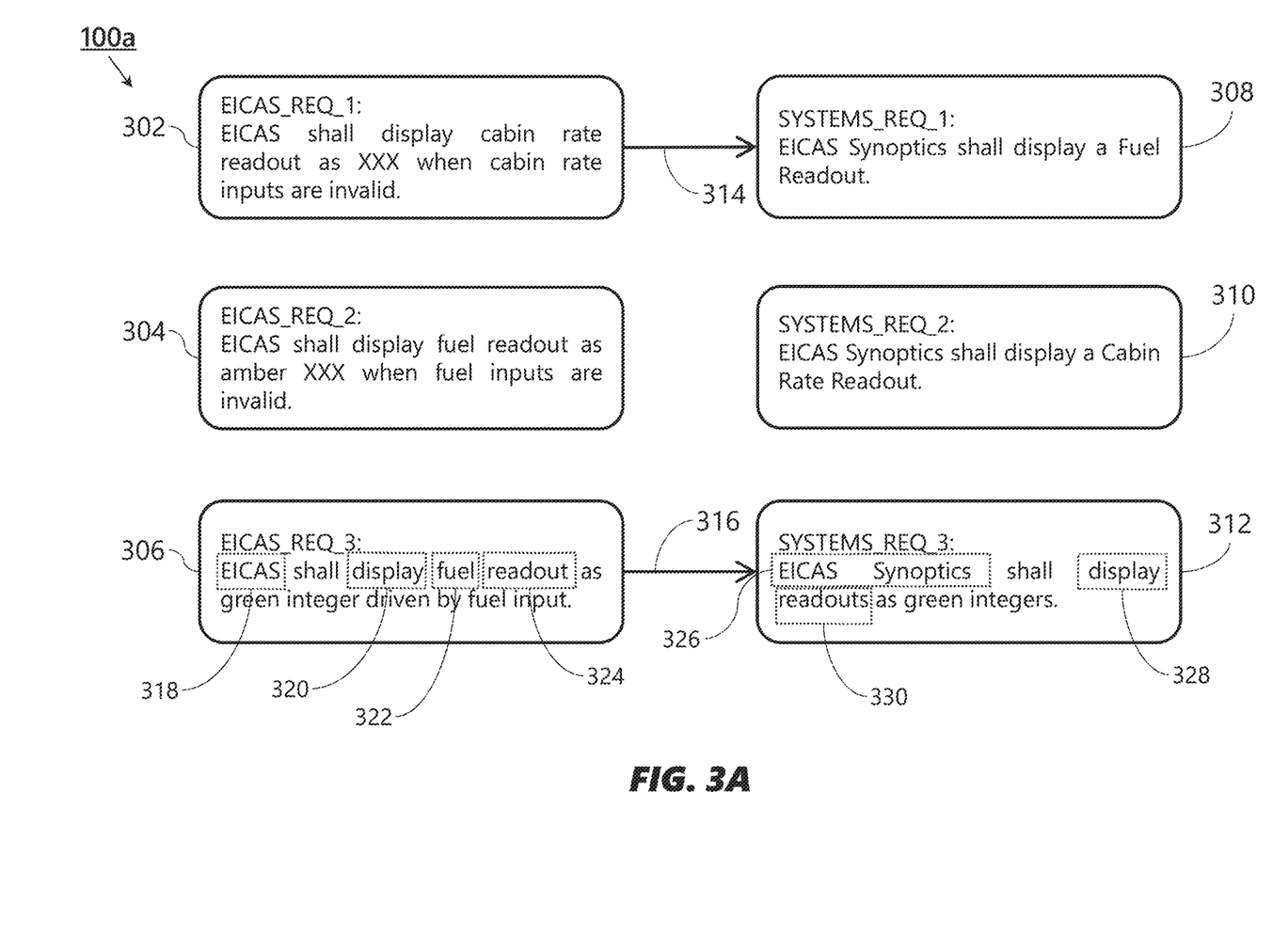
FIGS. 3A through 3C are diagrammatic illustrations or operations of the tool of FIG. 1.
Figure 3B:
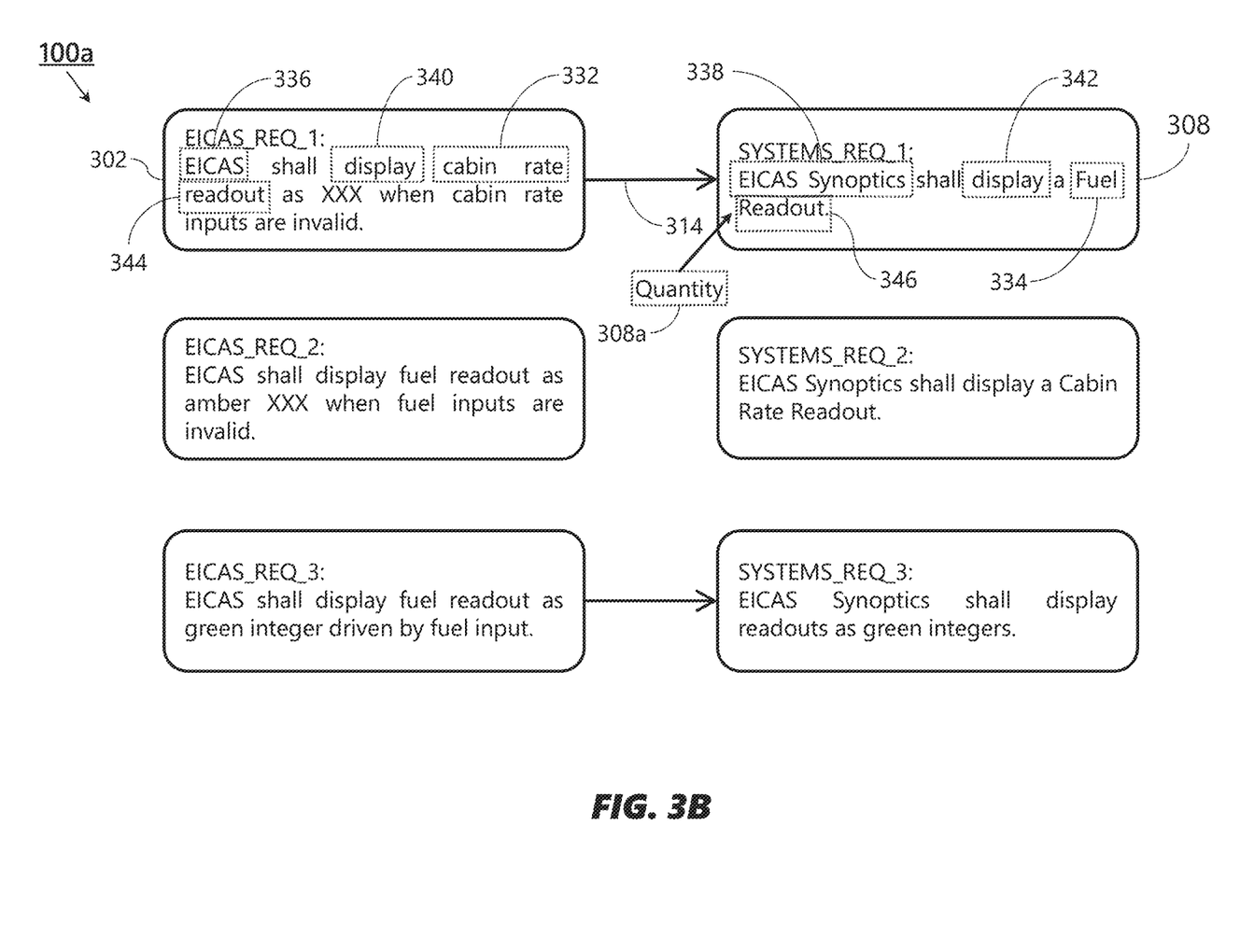
Figure 3C:
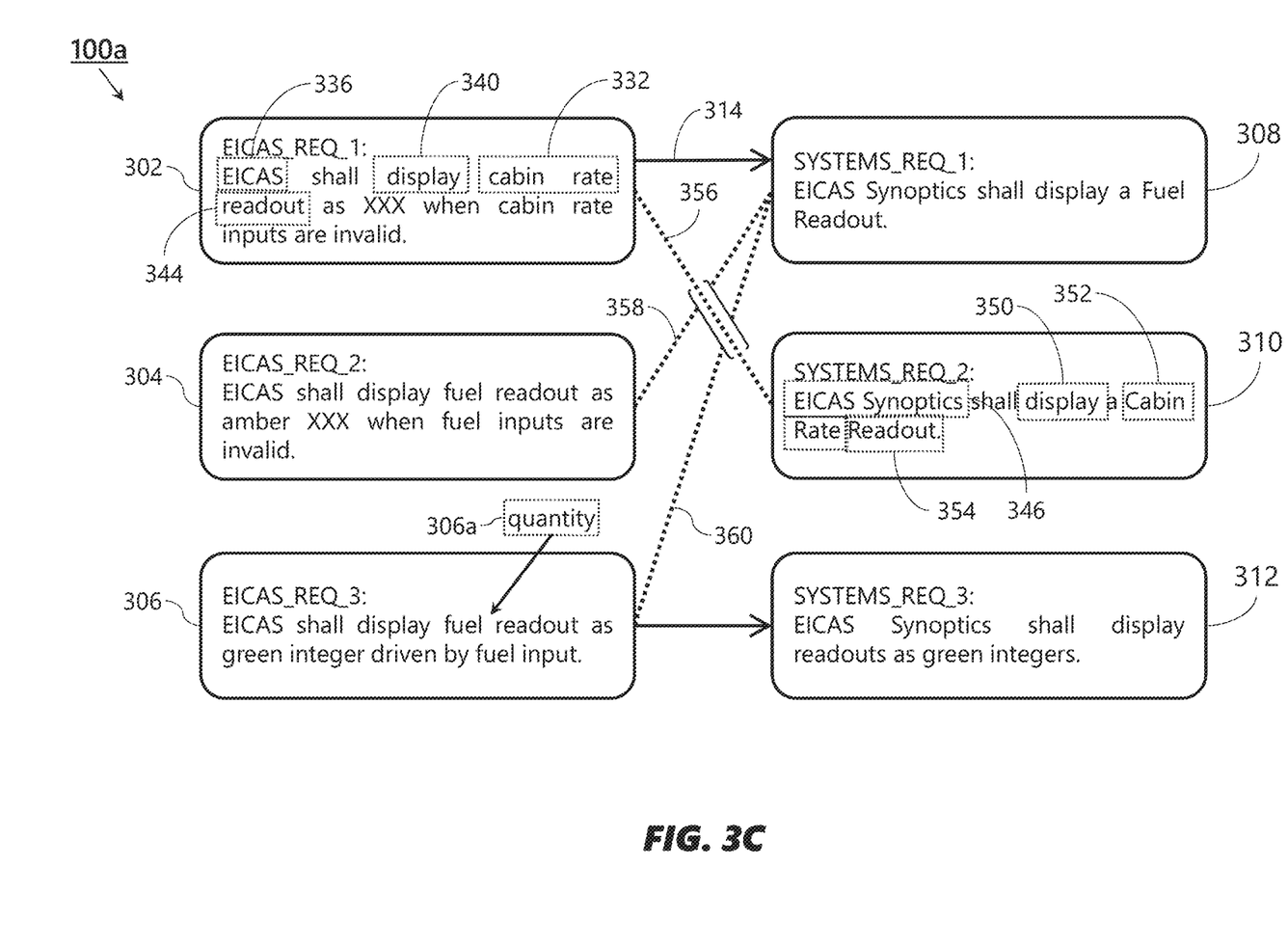

Referring to FIGS. 3A through 3C, the RTPV tool 100a may be implemented and may function similarly to the RTPV tool 100 of FIG. 1, except that the RTPV tool 100a may identify subsystem requirements (e.g., engine indicating and crew alerting system (EICAS) requirements) 302, 304, 306, system requirements 308, 310, 312, and links 314 and 316.

For example, referring in particular to FIG. 3A, the EICAS requirement 306 may provide that the EICAS shall display fuel readouts as green integers driven by fuel input (e.g., via a multicolor cockpit display). The requirements input 110 of FIG. 1 may provide for the link 316 tracing the subsystem-level EICAS requirement 306 to the system-level requirement 312, which provides that the EICAS synoptics display all readouts as green integers. Similarly, the EICAS requirement 302 may provide that the EICAS shall display a cabin rate readout in a certain fashion ("XXX") when cabin rate inputs are invalid. Per the requirements input 110, this EICAS requirement 302 may trace to the system-level requirement 308, which provides that the EICAS synoptics (e.g., a displayable visual representation of the fuel system) shall display a fuel readout.

It should be noted that conventional requirements tracing tools would note the links 314 and 316 as existing, and that the subsystem-level EICAS requirement 304, providing that the EICAS display fuel readouts in amber when fuel inputs are invalid, has no links or traces. However, conventional tools would not be able to determine, for example, 1) whether or not the link 314 is a correct link, or 2) to which system-level requirement/s the orphan subsystem-level EICAS requirement 304 should link.

The RTPV tool 100a may address these shortcomings via the NLP engine (102, FIG. 1), which identifies key components within the text of the requirements input (110, FIG. 1) to assess the correctness as well as the completeness of system requirements. For example, the RTPV tool 100a may analyze the EICAS subsystem-level requirement 306 "EICAS shall display fuel readout as green integer driven by fuel input" and identify therein, with a particular level of confidence: a subsystem 318 ("EICAS"); an action to be taken 320 ("(shall) display"); a feature 322 ("fuel"); and an indicator type 324 ("readout"). The RTPV tool 100a may be trained via machine learning to understand sentence structure and distinguish subject nouns (the subsystem 318, "EICAS") from verbs (the action 322, "display") and object nouns (the indicator type 324, "readout"). In addition, the RTPV tool 100a may account for past natural language analyses of other requirement sets in its evaluation of the requirements input 110.

Based on this training, the RTPV tool 100a may assess the quality of existing links (314, 316) and recommend links for orphan requirements (304) by identifying and matching key components across the requirements input 110. For example, the RTPV tool 100a may identify within the system-level requirement 312 a system 326 ("EICAS Synoptics"), an action 328 ("(shall) display"), and an indicator type 330 ("readouts") highly similar to the subsystem 318, action 320, and indicator type 324 identified in the subsystem-level EICAS requirement 306. The RTPV tool 100a may thus conclude, to a relatively high level of confidence, that the link 316 is correct (e.g., that the probability is high that the link 316 is correct).

Referring in particular to FIG. 3B, with respect to the link 314, the RTPV tool 100a may identify a different feature 332 ("cabin rate" (e.g., cabin rate of climb)) within the subsystem-level EICAS requirement 302 ("EICAS shall display cabin rate readout as XXX when cabin rate inputs are invalid") than in the system-level requirement 308 (feature 334, "fuel"). Accordingly, while the RTPV tool 100a may identify within the subsystem-level EICAS requirement 302 and the system-level requirement 308 a similar subsystem 336 ("EICAS") and system 338 ("EICAS Synoptics"), a similar action 340, 342 ("(shall) display"), and a similar indicator type 344, 346 ("readout"), the dissimilarity of the features 332 and 334 ("cabin rate"/"fuel") may lead the RTPV tool to conclude that the probability that the link 314 is correct is relatively low. Depending upon the precise confidence level, the RTPV tool 100a may flag the link 314 as either "suspicious" or "poor" rather than "good" or "correct".

The RTPV tool 100a may further promote uniformity and clarity within the requirements input 110 by analyzing requirements associated with suspicious links for potential clarification or improvement by amending the wording of the requirements. For example, as noted above, the RTPV tool 100a may assess the link 314 from EICAS requirement 302 to system-level requirement 308 and flag the link as "suspicious" or "poor". The ML engine 106 may further recommend revising the language of the system-level requirement 308 (SYSTEMS_REQ_1) to add the clarifying term "Quantity" (308a), the revised requirement reading "EICAS Synoptics shall display a Fuel Quantity Readout." This suggested revision may clarify to the RTPV tool 100a the dissimilarity between the system-level requirement 308 (SYSTEMS_REQ_1) and the subsystem-level requirement 302 (EICAS_REQ_1), reinforcing the assessment of the link 314 as an incorrect, "suspicious" or "poor" link and reducing the correctness level of said link.

Referring in particular to FIG. 3C, the RTPV tool 100a may recommend new links based on its natural language analysis, including links from orphan requirements as well as additional links between requirements which may already link or trace. For example, the RTPV tool 100a may identify the link 314 between the subsystem-level EICAS requirement 302 and the system-level requirement 308 as incorrect, as shown by FIG. 3B. However, the RTPV tool 100a may note that the subsystem 336 ("EICAS"), action 340 ("(shall) display"), feature 332 ("cabin rate"), and indicator type 344 ("readout") identified within the subsystem-level EICAS requirement 302 are a close logical match for the system 348 ("EICAS Synoptics"), action 350 ("(shall) display"), feature 352 ("cabin rate"), and indicator type 354 ("readout") identified within the system-level requirement 310 ("EICAS Synoptics shall display a Cabin Rate Readout"). Accordingly, the RTPV tool 100a may recommend a link 356 tracing the subsystem-level EICAS requirement 302 to the system-level requirement 310 with a relatively high confidence level (e.g., a high estimated probability that the recommended link 356 would be correct). Based on a similar analysis of matching key components, the RTPV tool 100a may further recommend links 358, 360 respectively from the subsystem-level EICAS requirements 304, 306 to the system-level requirement 308.

The RTPV tool 100a may further analyze requirements associated with recommended links as candidates for clarification by revising the language or wording of the associated requirements. For example, as noted above with respect to FIG. 3B, the RTPV tool 100a may recommend modifying (308a, FIG. 3B) the system-level requirement 308 "EICAS Synoptics shall display a Fuel Quantity Readout" to emphasize the dissimilarity of the system-level requirement 308 and the subsystem-level requirement 302 (EICAS_REQ_1) and the low correctness level of the associated link 314. With respect to the recommended link 360, the ML engine 106 may further recommend revising (306a) the language of the subsystem-level requirement 306 (EICAS_REQ_3) to read "EICAS shall display fuel quantity readout as green integer driven by fuel input". The suggested revision 306a may help clarify the wording of the subsystem-level requirement 306 (e.g., a "fuel quantity readout" as opposed to some other type of fuel readout) and reinforce the correctness of the recommended link from the subsystem-level requirement 306 to the system-level requirement 308 (which, in its revised form, similarly recites a "fuel quantity readout").

Figure 4:
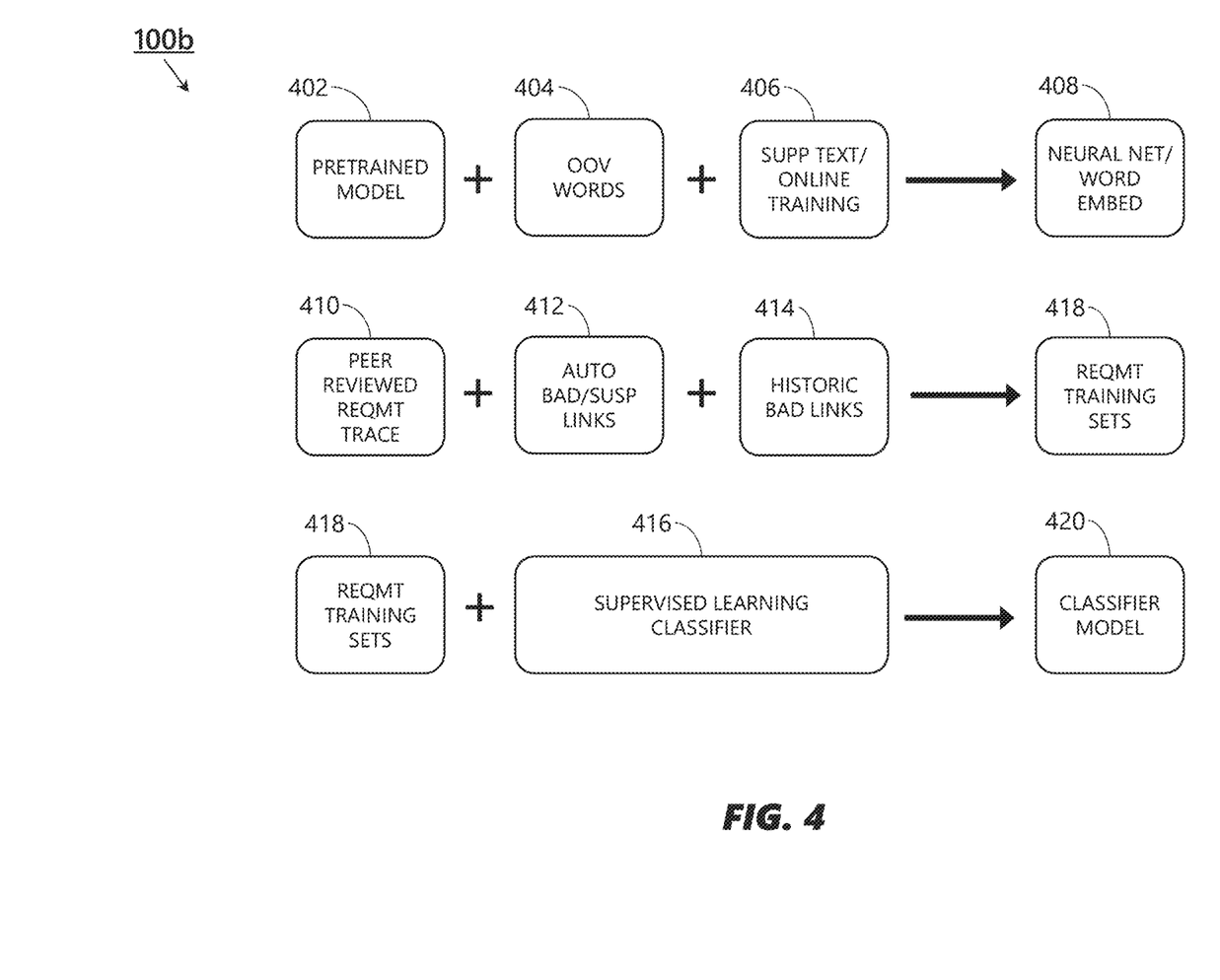
FIG. 4 is a diagrammatic illustration of machine learning operations of the tool of FIG. 1.

Referring to FIG. 4, the RTPV tool 100b may be implemented and may function similarly to the RTPV tools 100, 100a except that the RTPV tool 100b may be pretrained via machine learning techniques in addition to prior requirements tracing analyses stored to memory (108, FIG. 1). For example, the RTPV tool 100b may incorporate pretrained models 402 as a foundation for its vocabulary, with additional training in out-of-vocabulary (OOV) words 404 as well as supplemental texts and online training (406) to generate word embedding models and like neural networks 408 (e.g., Word2Vec) for enhancing the RTPV tool's avionics vocabulary power. If, for example, the NLP engine (102, FIG. 1) encounters one or more OOV words in the course of a textual analysis of a requirements input (110, FIG. 1), the RTPV tool 100b may suspend its analysis and perform additional OOV training and vocabulary building before resuming the analysis. Further, the neural network 408 may be applicable to additional avionics analysis functions beyond requirements tracing analysis; e.g., voice recognition.

With respect to its ability to evaluate and recommend links, the RTPV tool 100b may incorporate peer-reviewed requirements tracing sets 410 to identify "good" correct links and parse requirement components from tracing sets of ideal consistency. Autogenerated "bad" and "suspicious" links (412) as well as historic "bad" links 414 identified in prior tracing sets may be introduced into the peer-reviewed requirements tracing sets 410 to provide examples thereof and facilitate supervised learning (416) within a more realistic requirements training set (418). Supervised learning (416) via the requirements training sets, including both the peer reviewed sets 410 and the more realistic sets 418 including bad/suspicious links, may include analyzing requirements and sections for word mover's distance (WMD) and matching categories to build classifier models 420. Extensive training via machine learning may promote increased linguistic consistency and standardization of requirements tracing sets by identifying and understanding challenges faced by the RTPV tool 100b in learning to analyze and evaluate requirements and links.

Figure 5A:
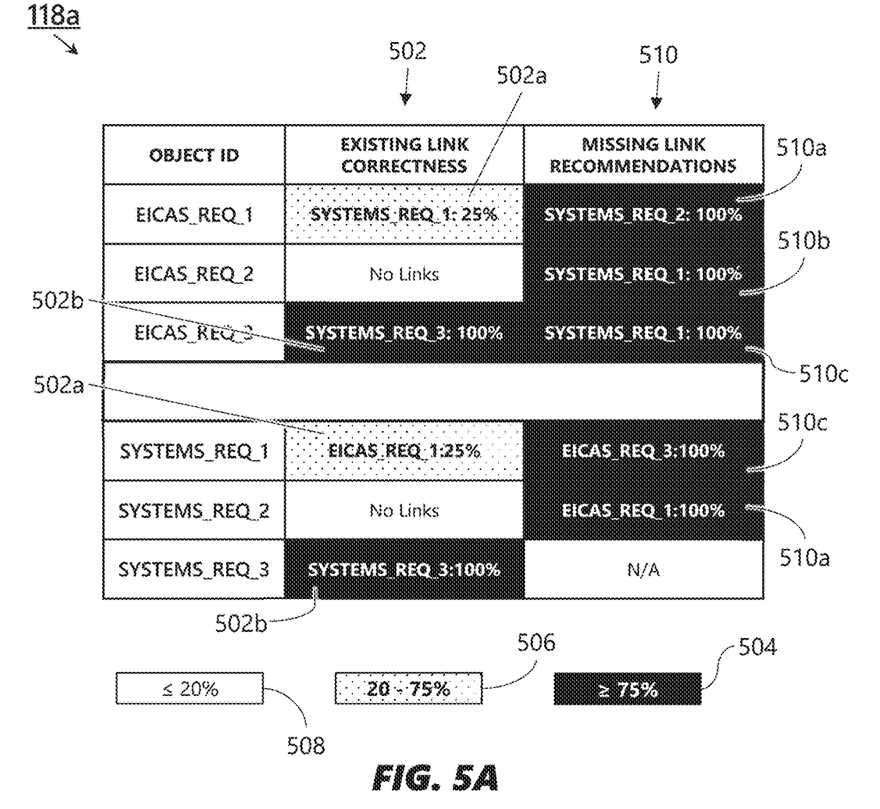
FIGS. 5A and 5B illustrate example outputs of the tool of FIG. 1.
Figure 5B:
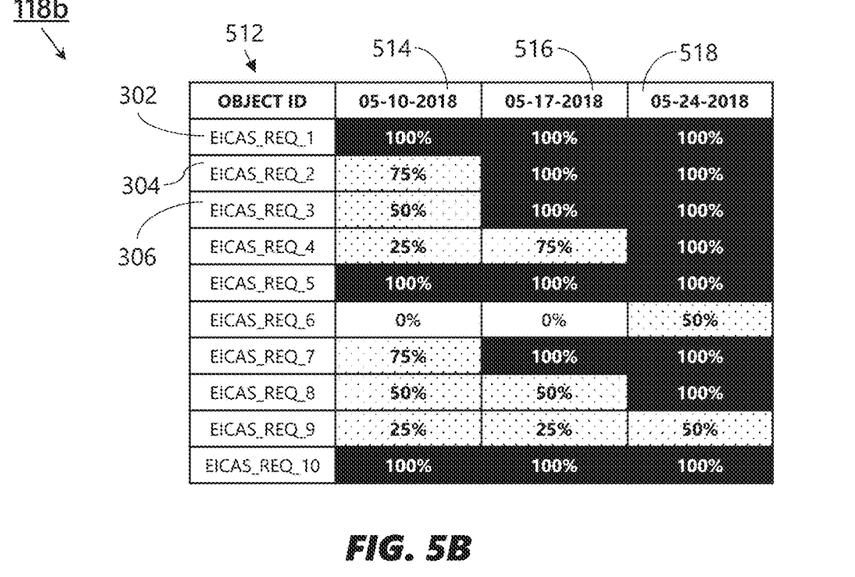

Referring to FIGS. 5A and 5B, the output reports 118a-b may be implemented and may function similarly to the output report 118 of FIG. 1, except that the RTPV tool 100, 100a-b may adapt its findings into a broad variety of output reports 118a-b to improve the monitoring and tracking of requirements tracing.

For example, referring in particular to FIG. 5A, the RTPV tool 100, 100a-b may generate a detailed output report 118a providing the determined correctness percentage or confidence level (502) of all identified links, including an assessment of the identified link as "good" (e.g., correct), "suspicious", or "bad" depending on the confidence level 502. For example, as shown by FIG. 3A, the RTPV tool 100, 100a-b may evaluate the link 314 (FIG. 3A) tracing the subsystem-level EICAS requirement EICAS_REQ_1 (302, FIG. 3A) to the system-level requirement SYSTEMS_REQ_1 (308, FIG. 3A) as having only a 25% probability of being correct (502a). The detailed output report 118a may classify all links having a confidence level of 75% or higher (504) as "good" (e.g., likely correct"), all links having a confidence level between 20% and 75% (506) as "suspicious" (e.g., questionably correct and perhaps worthy of further scrutiny), and all links having a confidence level of 20% or lower (508) as "bad" (e.g., likely incorrect). Accordingly, the 25% confidence level of the link from EICAS_REQ_1 to SYSTEMS_REQ_1 (502a) may be flagged as "bad", e.g., displayed in red or similarly indicating its status.

Similarly, the link 316 from subsystem-level EICAS requirement EICAS_REQ_3 (306, FIG. 3A) to system-level requirement SYSTEMS_REQ_3 (312, FIG. 3A) may be indicated by the detailed output report 118a as having been assessed by the RTPV tool 100, 100a-b as 100% likely to be correct. Accordingly, the 100% confidence level (502b) of the link between EICAS_REQ_3 and SYSTEMS_REQ_3 may be flagged as "good" and colored green (or otherwise displayed to indicate its status). "Suspicious" links having a confidence level between 20% and 75% (506) may similarly be displayed in yellow to indicate their status in the middle ground between "good" and "bad" links.

The detailed output report 118a may additionally show the determined confidence level (510) of recommended links to indicate the likelihood that a recommended link will be correct, and should be added to the requirements set. For example, the recommended links (356, 358, 360; FIG. 3C) from, respectively, EICAS_REQ_1 (302) to SYSTEMS_REQ_2 (310, FIG. 3C), EICAS_REQ_2 (304, FIG. 3C) to SYSTEMS_REQ_1 (308), and EICAS_REQ_3 (306) to SYSTEMS_REQ_1 may each be assessed by the RTPV tool 100, 100a-b as 100% likely correct. Accordingly, the respective confidence levels 510a, 510b, 510c for the recommended links 356, 358, 360 may be displayed by the detailed output report 118a in red, or otherwise indicated to suggest action be taken.

Referring to FIG. 5B, the linking health report 118b may track the high-level correctness of subsystem and system requirements over an extended period of time. For example, while a software environment is developing, its associated network of requirements should improve in correctness over time; a decline in correctness may indicate a fault to be addressed. The linking health report 118b may list each subsystem-level and system-level requirement (512) and for each individual requirement, e.g., the subsystem-level EICAS requirements EICAS_REQ_1 (302), EICAS_REQ_2 (304), and EICAS_REQ_3 (306), may be assessed at a particular time interval (514, 516, 518) and displayed according to its confidence level (e.g., flagged as "good", "bad", or "suspicious".

Figure 6:
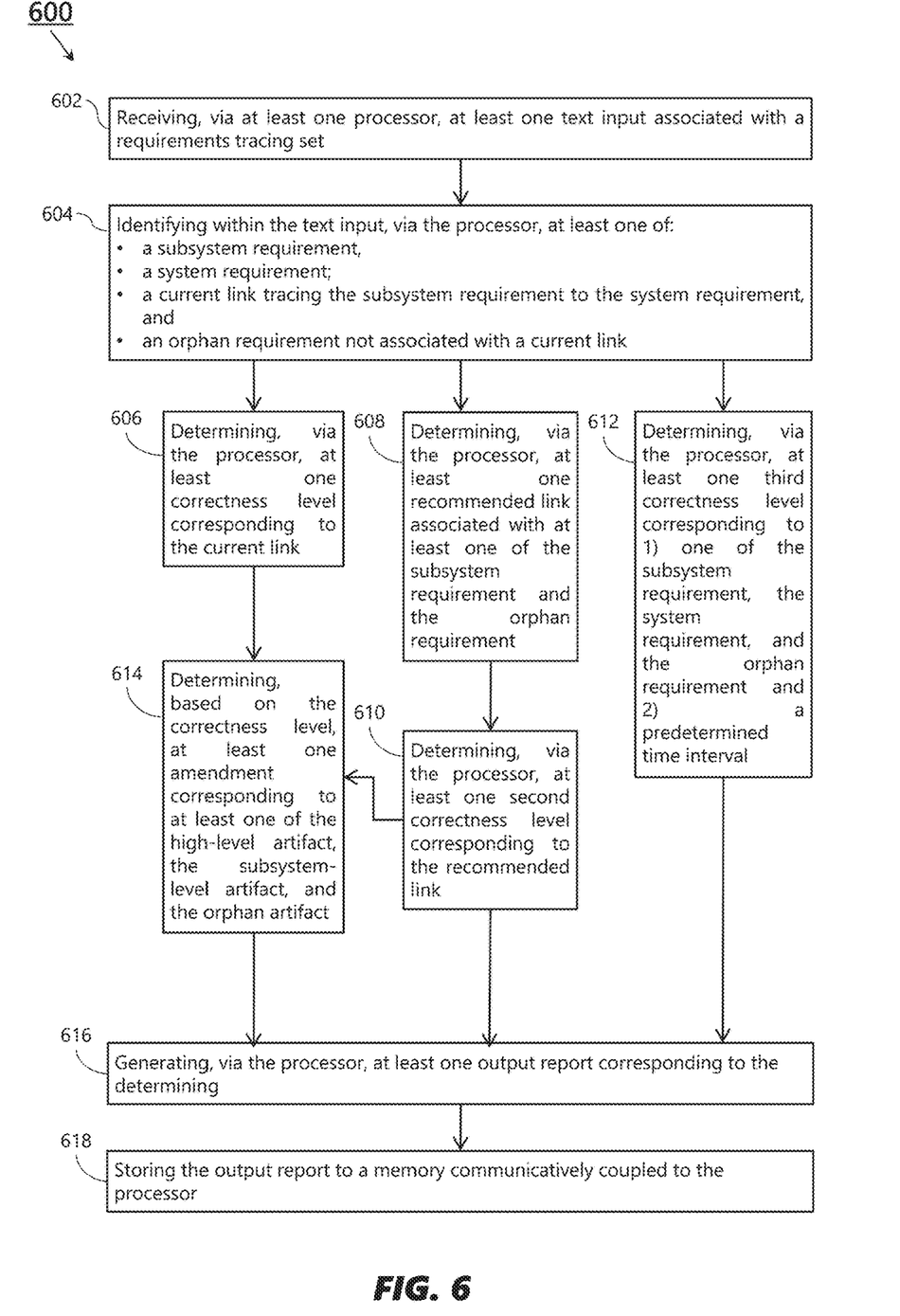
FIG. 6 is a process flow diagram of an exemplary embodiment of a method for requirements tracing validation according to the inventive contents disclosed herein.

Referring now to FIG. 6, an exemplary embodiment of a method 600 for requirements tracing validation according to the inventive concepts disclosed herein may be implemented by the RTPV tool 100, 100a-b in some embodiments, and may include one or more of the following steps.

At a step 602, the RTPV tool 100, 100a-b receives a text input associated with a requirements tracing set.

At a step 604, the RTPV tool identifies within the text input one or more of 1) a subsystem-level artifact or requirement; 2) a system-level or high-level artifact or requirement; 3) a current link tracing the subsystem-level requirement to the system-level requirement; and 4) an orphan artifact or requirement, or an artifact of any level not already associated (via tracing, or tracing to) a link of any kind.

At a step 606, the RTPV tool determines a correctness percentage (e.g., confidence level in the correctness of) the current link. The RTPV tool may determine this correctness percentage, as well as the correctness percentages of recommended links or requirements and links over time as noted below, taking into account one or more previously executed analyses of requirement sets stored to memory by the tool. In addition to the correctness level, the RTPV tool may indicate its assessment of the current link (or of other recommended links and requirements as noted below) as "good", "suspicious", or "bad" based on the correctness percentage.

At a step 608, the RTPV tool recommends one or more links, either tracing a subsystem requirement to a new system requirement or establishing a trace from an orphan requirement otherwise unlinked.

At a step 610, the RTPV tool determines a completeness level of the recommended link or links (e.g., a confidence level that the recommended links would be correct and should be added).

At a step 612, the RTPV tool determines a correctness level of the subsystem requirement/s, the system requirement/s, the orphan requirement/s, the current link/s, or the recommended link/s and a predetermined time interval in order to evaluate the health of the requirements or links over time.

At a step 614, the RTPV tool recommends amendments or revisions to the wording of requirements or artifacts, particularly those associated with "poor" or "suspicious" links or with newly recommended links.

At a step 616, the RTPV tool generates an output report of its determinations.

At a step 618, the RTPV tool stores its output reports to memory, e.g., for use in training or informing future analyses of requirement sets.

As will be appreciated from the above, systems and methods according to embodiments of the inventive concepts disclosed herein may enhance requirements training validation by assessing the quality of links rather than merely confirming their existence. Further, the RTPV tool can assess the completeness of a requirements training set by recommending new links from orphan requirements, or where they might not otherwise exist, and evaluating whether these recommended links should be added to the set. Finally, as the RTPV tool is trained via machine learning and by its own evaluations over time, use of the tool may help promote linguistically consistent and logically precise requirements design by identifying challenges to its natural language processing and offering suggestions to update the wording of requirements and other artifacts to address these challenges and clarify generally the language of the requirements set.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A requirements tracing validation tool, comprising:
   data storage capable of storing processor-executable instructions;
   at least one natural language processing (NLP) engine trained according to one or more machine learning (ML) techniques, the at least one NLP engine configured to receive at least one requirements input comprising a plurality of requirements associated with an avionics software environment, the NLP engine trained to: identify within the requirements input at least one of:
   1) a high-level artifact;
   2) a subsystem-level artifact;
   3) a current link associated with at least one of the subsystem-level artifact and the high-level artifact; and
   4) an orphan artifact not associated with an existing link by analyzing a textual content of the requirements input;
   at least one link correctness (LC) engine communicatively coupled to the NLP engine and trained according to the one or more ML techniques to determine at least one of:
   1) a first correctness level corresponding to the current link;
   2) a recommended link associated with at least one of the subsystem-level artifact, the high-level artifact, and the orphan artifact; and
   3) a second correctness level corresponding to the recommended link; and
   at least one ML engine communicatively coupled to the NLP engine and the LC engine, the ML engine configured to train the NLP engine and the LC engine based on one or more of a requirements training set and a prior analysis of the requirements training set.

2. The requirements tracing validation tool of claim 1, wherein:
   the high-level artifact includes at least one of an applicant-level requirement and a system requirement; and
   the subsystem-level artifact includes at least one of a subsystem requirement, a subsystem-level verification, and subsystem-level source code.

3. The requirements tracing validation tool of claim 1, wherein the first correctness level includes an assessment of the current link as one of a good link, a suspicious link, and a poor link.

4. The requirements tracing validation tool of claim 3, wherein the assessment is based on at least one correctness threshold.

5. The requirements tracing validation tool of claim 1, wherein the second correctness level corresponds to a confidence level that the recommended link should be added to the plurality of requirements.

6. The requirements tracing validation tool of claim 1, wherein the current link traces the subsystem-level artifact to the high-level artifact.

7. The requirements tracing validation tool of claim 1, wherein the LC engine is configured to:
   a) determine at least one third correctness level corresponding to:
      1) one of the subsystem-level artifact, the high-level artifact, and the orphan artifact; and
      2) a predetermined time interval; and
   b) generate at least one output report including at least one of the subsystem-level artifact, the high-level artifact, the orphan artifact, the third correctness level, and the time interval.

8. The requirements tracing validation tool of claim 1, wherein the ML engine is configured to generate at least one amendment, the amendment corresponding to at least one of the subsystem-level artifact, the high-level artifact, and the orphan artifact.

9. The requirements tracing validation tool of claim 1, wherein the NLP engine is configured to identify, within at least one of the subsystem-level artifact, the high-level artifact, and the orphan artifact, at least one of an associated subsystem, an associated system, an associated action, an associated feature, and an associated indicator.

10. The requirements tracing validation tool of claim 1, wherein the LC engine is configured to:
    generate at least one output report, the output report including at least one of the current link, the recommended link, the first correctness level, and the second correctness level; and
    store the output report to the data storage.

11. The requirements tracing validation tool of claim 10, wherein the requirements input is a first requirements input, the output report corresponds to a first requirements analysis, and:
    the LC engine is configured to perform at least one second requirements analysis based on:
        a) one of the first requirements input and at least one second requirements input; and
        b) the at least one stored output report.

12. The requirements tracing validation tool of claim 1, wherein the high-level artifact is associated with a mobile platform and the subsystem requirement is associated with a subsystem of the mobile platform.

13. A method for requirements tracing validation, the method comprising:
    performing at least one first training of a natural language processing (NLP) engine to analyze a textual content according to one or more machine learning (ML) techniques;
    performing at least one second training of a link correctness (LC) engine to assess one or more of a avionics software requirement and a link connecting a pair of the avionics software requirements according to the one or more ML techniques;
    receiving, via the NLP engine, at least one requirements input associated with a requirements tracing set;
    identifying within the requirements input at least one of a high-level artifact, a subsystem-level artifact, a current link tracing the subsystem-level artifact to the high-level artifact, and an orphan artifact not associated with an existing link by analyzing a textual content of the requirements input via the NLP engine according to the at least one first training; and
    determining, via the LC engine, at least one correctness level corresponding to the current link according to the at least one second training.

14. The method of claim 13, wherein the at least one correctness level is a first correctness level and determining, via the LC engine, at least one correctness level corresponding to the current link according to the at least one second training includes:
    determining, via the LC engine, at least one recommended link associated with at least one of the high-level artifact, the subsystem-level artifact, and the orphan artifact; and
    determining, via the LC engine, at least one second correctness level corresponding to the recommended link.

15. The method of claim 13, wherein determining, via the LC engine, at least one correctness level corresponding to the current link according to the at least one second training includes:
    assessing, via the processor, the current link as one of a good link, a suspicious link, and a poor link based on at least one correctness threshold.

16. The method of claim 13, wherein the correctness level is a first correctness level, and determining, via the LC engine, at least one correctness level corresponding to the current link according to the at least one second training includes:
    determining, via the processor, at least one third correctness level corresponding to 1) one of the subsystem-level artifact, the high-level artifact, and the orphan artifact and 2) a predetermined time interval.

17. The method of claim 13, further comprising:
    generating, via the LC engine, at least one output report corresponding to the determining; and
    storing the output report to a memory communicatively coupled to the LC engine.

18. The method of claim 17, wherein determining, via the LC engine, at least one correctness level corresponding to the current link according to the at least one second training includes:
    determining the at least one correctness level based on the at least one stored output report.

19. The method of claim 13, further comprising:
    determining via the LC engine, based on the correctness level, at least one amendment corresponding to at least one of the high-level artifact, the subsystem-level artifact, and the orphan artifact.

* * * * *